United States Patent
Rajendran

(10) Patent No.: US 12,323,298 B2
(45) Date of Patent: Jun. 3, 2025

(54) OPEN RADIO ACCESS NETWORK (ORAN) DISTRIBUTED UNIT WITH MUTLIPLE CENTRALIZED UNITS

(71) Applicant: DISH WIRELESS L.L.C., Englewood, CO (US)

(72) Inventor: Karupaiah Rajendran, Sachse, TX (US)

(73) Assignee: DISH Wireless L.L.C., Englewood, CO (US)

( * ) Notice: Subject to any disclaimer, the term of this patent is extended or adjusted under 35 U.S.C. 154(b) by 27 days.

(21) Appl. No.: 18/187,625

(22) Filed: Mar. 21, 2023

(65) Prior Publication Data
US 2024/0323086 A1    Sep. 26, 2024

(51) Int. Cl.
*H04L 41/0823*  (2022.01)
*H04W 24/02*  (2009.01)

(52) U.S. Cl.
CPC ......... *H04L 41/0836* (2013.01); *H04W 24/02* (2013.01)

(58) Field of Classification Search
CPC ............. H04L 41/0836; H04L 41/0803; H04L 41/0823; H04L 41/08
See application file for complete search history.

(56) References Cited

U.S. PATENT DOCUMENTS

| | | | | |
|---|---|---|---|---|
| 10,735,996 B2* | 8/2020 | Mehta | ................ | H04W 28/082 |
| 10,869,217 B2* | 12/2020 | Kaushik | .................. | H04L 47/20 |
| 10,924,940 B2* | 2/2021 | Ashrafi | ............... | H04L 12/1407 |
| 11,330,653 B2* | 5/2022 | Paladugu | ............... | H04W 24/10 |
| 11,357,076 B2* | 6/2022 | Bedekar | ................ | H04W 76/11 |
| 11,979,349 B2* | 5/2024 | Zhang | ............... | H04W 28/0263 |
| 2019/0387561 A1* | 12/2019 | Paladugu | ............. | H04B 7/0413 |
| 2021/0219182 A1* | 7/2021 | Yuan | ................. | H04W 28/0983 |
| 2023/0055306 A1* | 2/2023 | Ghadge | ............. | H04W 28/0215 |
| 2024/0276580 A1* | 8/2024 | Shete | .................... | H04W 76/34 |
| 2024/0323086 A1* | 9/2024 | Rajendran | ........... | H04L 41/0836 |

* cited by examiner

*Primary Examiner* — Backhean Tiv
(74) *Attorney, Agent, or Firm* — Jeremiah J. Baunach; Frontier IP Law PLLC

(57) ABSTRACT

An Open radio access network (ORAN) configured for accessing a 5G Core network to provide voice and data services to one or more mobile terminals, includes radio units (RUs), distributed units (DUs) and a centralized unit (CU) pool. The ORAN is configured such that each DU is configured to be associated concurrently to a primary CU and a secondary CU, both selected from the CU pool according to predetermined criteria. Upon occurrence of a predetermined event, the DU switches the secondary CU to become the primary CU, without resulting an outage in the ORAN.

20 Claims, 6 Drawing Sheets

OPEN RADIO ACCESS NETWORK (ORAN) DISTRIBUTED UNIT WITH MUTLIPLE CENTRALIZED UNITS

BRIEF SUMMARY

Network components in a cellular telecommunication or data network, including various network functions, may have configurations that require updating during network operation or as the network environment changes (e.g., as network participants are added or removed, as additional services are required or retired, or when additional network capacity is required). It is desirable that the network components are maintained, supported, or furnished by multiple vendors or network equipment manufacturers. Different network components may offer different capabilities (e.g., throughput capacity, functionality, or performance) that may be called upon, depending on the network need, at any given time. Updating the configuration of or replacing network components (e.g., in response to a network environment change) may necessitate suspending operation in one or more of the network components, which may result in a service outage in at least a part of the cellular telecommunication or data network. Thus, it is advantageous to have the efficient techniques and processes, as described herein, for updating configuration of cellular telecommunication network components in the cellular telecommunication or data network, while avoiding a service outage. It is with respect to these and other considerations that the embodiments described herein have been made.

Fifth-generation wireless (5G) technology provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized RAN with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them. This MEC technology is not exclusive to 5G but it significantly enhances 5G efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power better enables the high volume of connected devices inherent to 5G deployment and the rise of IoT.

The 3GPP 5G architecture is a service-based architecture (SBA), which implements IT network principles and a cloud-native design approach. In an SBA, each network function (NF) offers services to other NFs via Application Programming Interfaces (API). Network function virtualization (NFV) decouples software from hardware by replacing various network functions (e.g., firewalls, load balancers and routers) with virtualized instances running as software. Virtualization eliminates the cost of many expensive hardware elements and can also accelerate installation times, thereby providing revenue generating services to the customer faster.

NFV enables the 5G infrastructure by virtualizing appliances within the 5G network. For example, under NFV, a network slicing technology enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. Network disaggregation in RAN enables flexibility, provides open interfaces and open-source development, ultimately to case the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN is exemplified by an architecture ("ORAN architecture") which includes a set of radio base stations—each referred to as a "Next Generation Node B or "gNB"—connected to the 5G core (5GC) and to each other. The gNB incorporates three main functional modules: the Centralized Unit (CU), the distributed Unit (DU), and the Radio Unit (RU), which can be deployed in multiple combinations. The primary interface is referred to as the F1 interface between the DU and CU and are interoperable across vendors. The CU may be further disaggregated into the CU user plane (CU-UP) and CU control plane (CU-CP), connected to the DU over F1-U and F1-C interfaces, respectively. This 5G RAN architecture is described in 3GPP TS 38.401 V16.8.0 (2021 December). Each network function (NF) is formed by a combination of small pieces of software code called as microservices.

FIG. 1 shows gNB 100 to illustrate various communication protocols layers implemented in one example of the ORAN Architecture. As shown in FIG. 1, gNB 100 includes RU 101, DU 102 and CU 103. As shown in FIG. 1, CU 103 is further divided into CU-UP 103-1 and CU-CP 103-2. In gNB 100, RU 101 may be implemented, for example, at a cell tower and provides the physical interface to the wireless medium ("RF" for radio frequency). In gNB 100 of FIG. 1, the physical layer (PHY) functions are virtualized into two sublayers "PHY-low" and "PHY-high." Sublayer PHY-low is implemented in RU 101, while sublayer PHY-high is implemented in DU 102. As shown in FIG. 1, DU 102 implements, in addition to sublayer PHY-high, a media access control (MAC) layer, and a radio link control (RLC) layer. Both CU-UP 103-1 and CU-CP 103-2 packetize data communicated with upper protocol layers under the Packet Data Convergence Protocol (PDCP). CU-UP 103-1 further implements the Service Data Adaptation Protocol (SDAP). CU_CP 103-2 further implements the radio resource control (RRC) layer. CU 103 and DU 102 may be collocated (but not necessarily) in an edge-cloud network accessible from RU 101. Not shown in FIG. 1 are RAN intelligent controllers (RICs) for gNB 100, which may include a near-real time RIC and a non-real time RIC. These RICs may reside in the same edge-cloud network of DU 102 and CU 103. However, the RICs may also be implemented in a regional cloud network accessible from the edge-cloud network or any part of a 5G Core network. The RF, PHY, MAC, RLC, PDCP and SDAP protocol layers are generally known to those of ordinary skill in the art.

Embodiments, described herein may use containerization to implement such microservices and network functions, referred to as containerized network functions (CNFs). Containerization is the packaging of software code with just the operating system (OS) libraries and dependencies required to run the code to create a single lightweight executable (a container) that runs consistently on any infrastructure. Software platforms, such as Kubernetes, manage containerized workloads and automate the deployment, scaling, and management of containerized applications. Compared to virtual machines (VMs) containers have relaxed isolation properties to share the Operating System (OS) among the applications. Therefore, containers are considered lightweight. A container has its own file system, share of CPU, memory and process space. As they are decoupled from the underlying infrastructure, they are portable across clouds and OS distributions. As disclosed herein, CNFs of a 5G NR cellular telecommunication network may be hosted on a cloud service provider cloud and referred to herein as cloud-native network functions. One example suitable for hosting these CNFs is the Elastic Kubernetes Service (EKS).

Briefly described, embodiments disclosed herein are directed to a system that is vendor agnostic (i.e., supports multiple file formats and data modeling languages that may be used by various different O-RAN vendors). Under ORAN, a DU today only has connectivity to a single CU, which makes the RAN vulnerable to outage when the CU is required to be reconfigured for certain network conditions, such as maintenance, software updates and other critical updates. For example, an EKS update may require a CU to re-instantiate (e.g., reboot), resulting also in the suspension of services at all the DUs served by the CU, until the CU's recovery is complete. During such time, a gaping hole exists in the coverage of the operating network.

According to one embodiment of the present invention, each DU in ORAN has connectivity to a CU pool of multiple CUs. Each CU in the CU pool may have already configured specific capabilities that may be called upon on-demand, thereby minimizing the outage and ensures high reliability. In one example embodiment, a system of the present invention includes a plurality of DUs in which each DU of the plurality of DUs communicates with at least one primary CU and a secondary CU, and wherein a system user accesses NFs implemented in a 5G Core network in a first instance through the primary CU and in a second instance following the first instance through the secondary CU without service interruption.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

Figure 1:
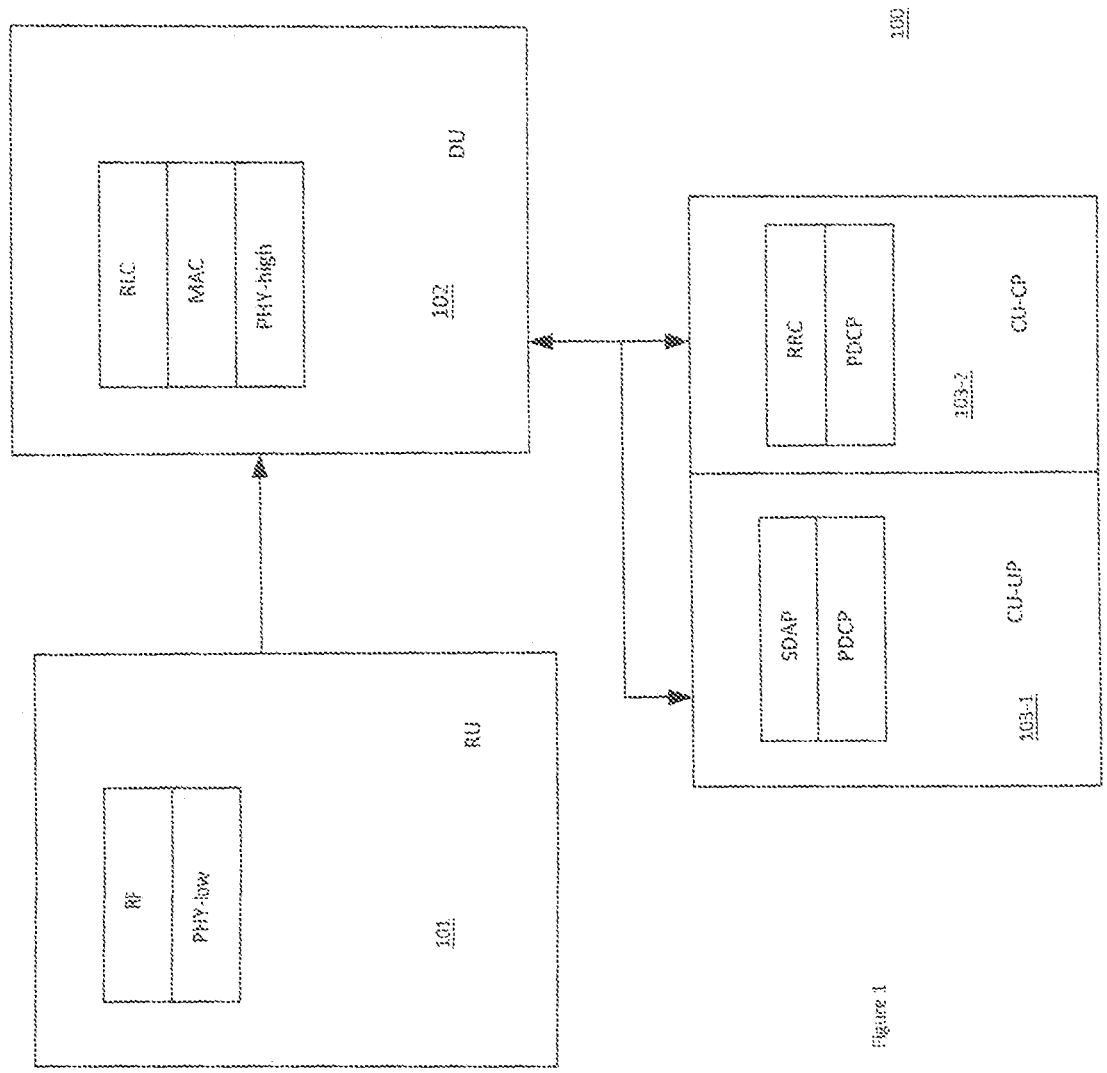
FIG. 1 shows gNB 100 to illustrate various communication protocols layers implemented in one example of the ORAN Architecture.

The following description, along with the accompanying drawings, sets forth certain specific details in order to provide a thorough understanding of various disclosed embodiments. However, one of ordinary skill in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems, networks and databases, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

According to one embodiment of the present invention, a DU accesses a CU pool—a selected group of CUs—and maps from the CU pool specific CUs as primary and secondary CUs, based on operational and parameters, such as backhaul and mid-haul bandwidths and latencies, availability, CU capacity (e.g., number of users or cells that are served by the CU), service features (e.g., packet forwarding, packet duplications and other PDCP services), and other key performance indicators. Key performance indicators may include, but are not limited to: peak data rate, peak spectral efficiencies, data rate experienced by user, area traffic capacity, user-plane latencies, connection density, energy efficiency, reliability, mobility, mobility interruption time, and system aggregated bandwidth. Until an outage in the primary CU is anticipated, the data traffic handled by the DU is processed by the primary CU. However, in anticipation of the outage, the DU makes the secondary CU its new primary CU, whereupon, traffic through the DU is switched over to the new primary CU. In some embodiments, voice calls at the time of the switch-over are allowed to complete with the pre-switch over primary CU.

Figure 2:
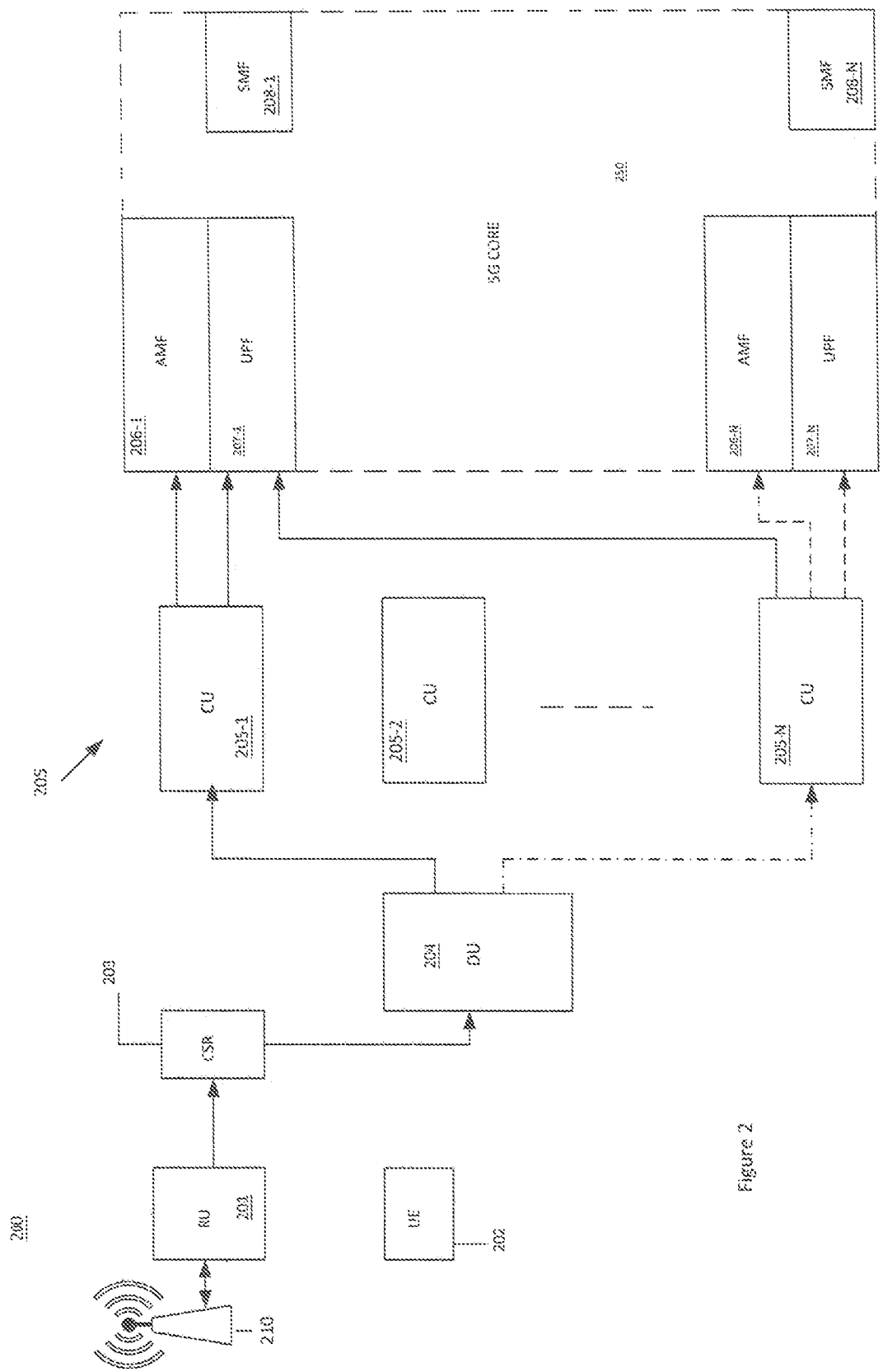
FIG. 2 illustrates DU 204 of ORAN 200 being associated with CU pool 205, according to one embodiment of the present invention.

FIG. 2 illustrates DU 204 of ORAN 200 being associated with CU pool 205, according to one embodiment of the present invention. As shown in FIG. 2, RU 201 of ORAN 200 is associated with a cell site 210. Cell site 210 serves a number of mobile user terminals, e.g., UE 202. RU 201 is connected through cell site router (CSR) 203 to DU 204. DU 204 is associated with CU pool 205, which includes numerous CUs, including CU 205-1, 205-2, . . . , and 205-N. Each CU in CU pool 205 may serve a number of DUs (e.g., 50), Each CU in CU pool 205 interacts with services provided in 5G Core network 250, where numerous control plane and user plane functions are provided. For example, each CU may access a set of control-plane access mobility functions (AMF), represented in FIG. 2 by AMF 206-1, 206-2, . . . and 206-N, and a set of user plane functions (UPF) 207-1, 207-2, . . . , and 270-N. Within 5G Core 250, additional services, e.g., session management services (SMF), represented in FIG. 2 by SMF 208-1, 208-2, . . . , and 208-N, may be provided to support, for example, the UPF services over an N4 interface. UPF services may relate to such services as internet traffic, WiFi services, IoT services and other broadband services. Each CU may access its AMF over an N2 interface and its UPF an N3 interface. The data traffic between each CU and the 5G Core network is sometimes referred to as "back-haul traffic," while the traffic between the DU and its associated CU is referred to as "mid-haul traffic."

FIG. 2 shows that DU 204 is associated with CU 205-1 (as its primary CU) and CU 205-N (as its secondary CU). When CU 205-1 requires a software update or otherwise requires a reconfiguration (e.g., a change system parameter values) to be performed, DU 204 re-homes its mid-haul traffic to secondary CU 205-N. A switch-over to the secondary CU may be required, for example, when DU 204's primary CU (e.g., CU 205-1) approaches a limit in the number of users it can handle ("CU user capacity") and DU 204 anticipates additional users requesting for its service. In that situation, DU 204 may re-home to the secondary CU, if the secondary CU has a higher CU user capacity. In some embodiments, re-homing can be accomplished as simply as replacing the network address of the primary CU by the network address of the secondary CU. To prepare the secondary CU for the switch-over, the secondary CU must have a configuration that is compatible with the mid-haul traffic that it will receive from the switch-over. Accordingly, FIG. 2 shows that CU 205-N accesses the set of UPFs associated with CU 205-1 (i.e., UPF 207-1) to confirm suitability of the switch-over.

To determine a candidate for association as a secondary CU, the relevant parameters may include:
(i) CU user capacity;
(ii) CU bearer capacity;
(iii) CU data rate capacity;
(iv) Current DU connectivity;
(v) CU resource capacity;
(vi) CU to UPF data rate capacity;
(vii) Current CU to UPF drop rate;
(viii) Current CU data rate performance metrics;
(ix) Current CU user drop rate; and
(x) Additional capabilities.

In this regard, "CU user capacity" refers to the number of users the CU is configured to handle. A DU expecting an increase in the number of users it will be supporting would seek a CU configured for a CU user capacity greater than that of its primary CU.

"CU bearer capacity" refers to capabilities of protocol features required by the expected user profiles (e.g., different data rates for voice and data traffic, classes of quality of service (QOS), and connectivity services, such as WiFi hotspot support). In some instances, the CU may have specific licensing restrictions that limit the classes or number of users it may handle.

"CU data rate capacity" refers to the highest data throughput rate configured in the CU. A DU expecting an increase in data traffic it will be supporting would seek a CU configured for a higher CU data rate capacity greater than that of its primary CU. For example, a DU having a 1 Gbits per second (Gbps) connection with a CU may anticipate an increase in mid-haul data traffic that requires a higher data rate connection (e.g., 10 Gbps) with another CU.

Current DU connectivity (i.e., the number of DUs currently actively connected at the CU) is a consideration because a DU would prefer its secondary CU not reaching its DU connectivity limit when it makes its secondary CU primary.

"CU resource capacity" refers to the hardware and software resources available to the DU. In this regard, the resources may refer to the computational and data storage resources.

"CU to UPF data rate capacity" refers to the CU's back-haul traffic capacity. A DU expecting an increase in demand for user plane services it will be supporting would seek a CU configured for a higher CU to UPF data rate capacity greater than that of its primary CU.

"Current CU to UPF drop rate" refers to a current performance metric relating to successful satisfaction of requested user plane services by the CU. This performance metrics relate not only to the traffic between the CU and the 5G core, but also the "next hop" performance (i.e., the performance in the 5G Core network handling the user plane services requested by the CU). A DU seeking an improvement in successful service completion in its services to users would seek a CU experiencing a lower CU to UPF drop rate than its primary CU. In some embodiments, the expected improvement must exceed a predetermined threshold, to avoid the DU frequently switching back and forth between CUs.

"Current CU data rate performance metrics" refers to the CU's control plane and user plane performances, as measured by various industry standard performance metrics (e.g., key performance index (KPI). A DU seeking an overall improvement in its services to users would seek a CU experiencing higher current CU data rate performance metrics than its primary CU. In some embodiments, the expected improvement must exceed a predetermined threshold to avoid the DU frequently switching back and forth between CUs.

"Current CU user drop rate" refers to the CU's current ability to complete services requested by a user (e.g., voice call completion, or data streaming completion). In this regard, the CU user drop rate typically excludes drops due to the physical media (i.e., RF-related). A DU seeking an improvement in CU user drop rate would seek a CU experiencing a lower current CU user drop rate than that its primary CU is experiencing. In some embodiments, the expected improvement must exceed a predetermined threshold to avoid the DU frequently switching back and forth between CUs.

The DU may consider additional capabilities (e.g., IP services, ViNR Services, VONR Services, Tracking Area Code (TAC) services, trace collection protocol (TCP) capability, security features) a CU may offer.

In some embodiments, to select a secondary CU, a DU may consider CUs in the CU pool according to some or all of the above considerations and rank the CUs accordingly. The highest rank CU may then be associated as the secondary CU. When a need to switch over arises (e.g., a schedule update of the primary CU, or an improvement in performance over the primary CU is desired), the DU sets the secondary CU as its new primary CU, such that subsequent DU traffic is processed by the new primary CU. As the association is established before the switch-over, outage resulting from the need for reconfiguration in the primary CU, or the primary CU reaching its configured capacity limits, may be avoided. In some embodiments, the switch-over may take place over a time period to allow existing voice or data sessions to complete.

Figure 3:
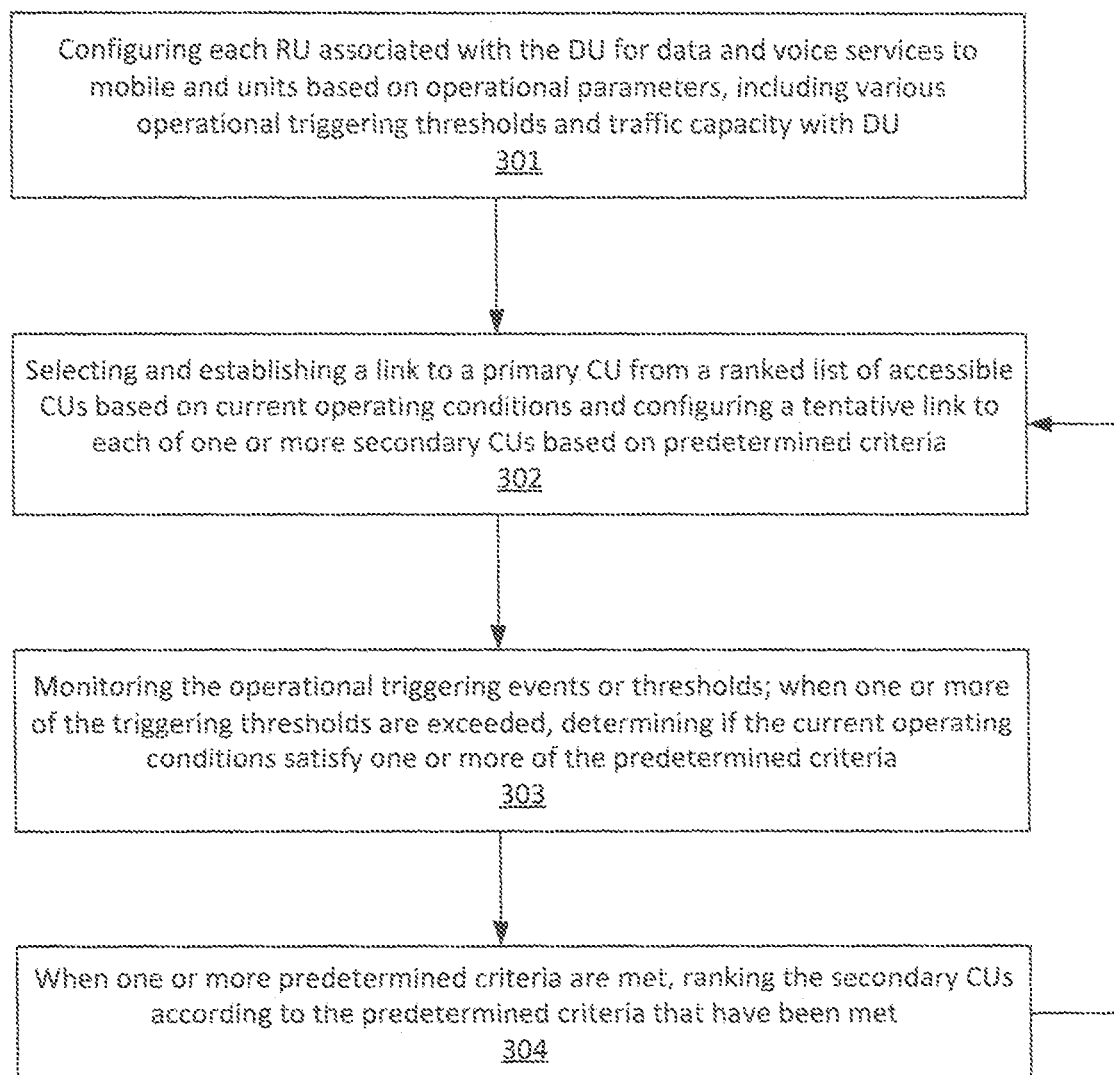
FIG. 3 is an overview that illustrates the operations of a DU, according to one embodiment of the present invention.
Figure 4A:
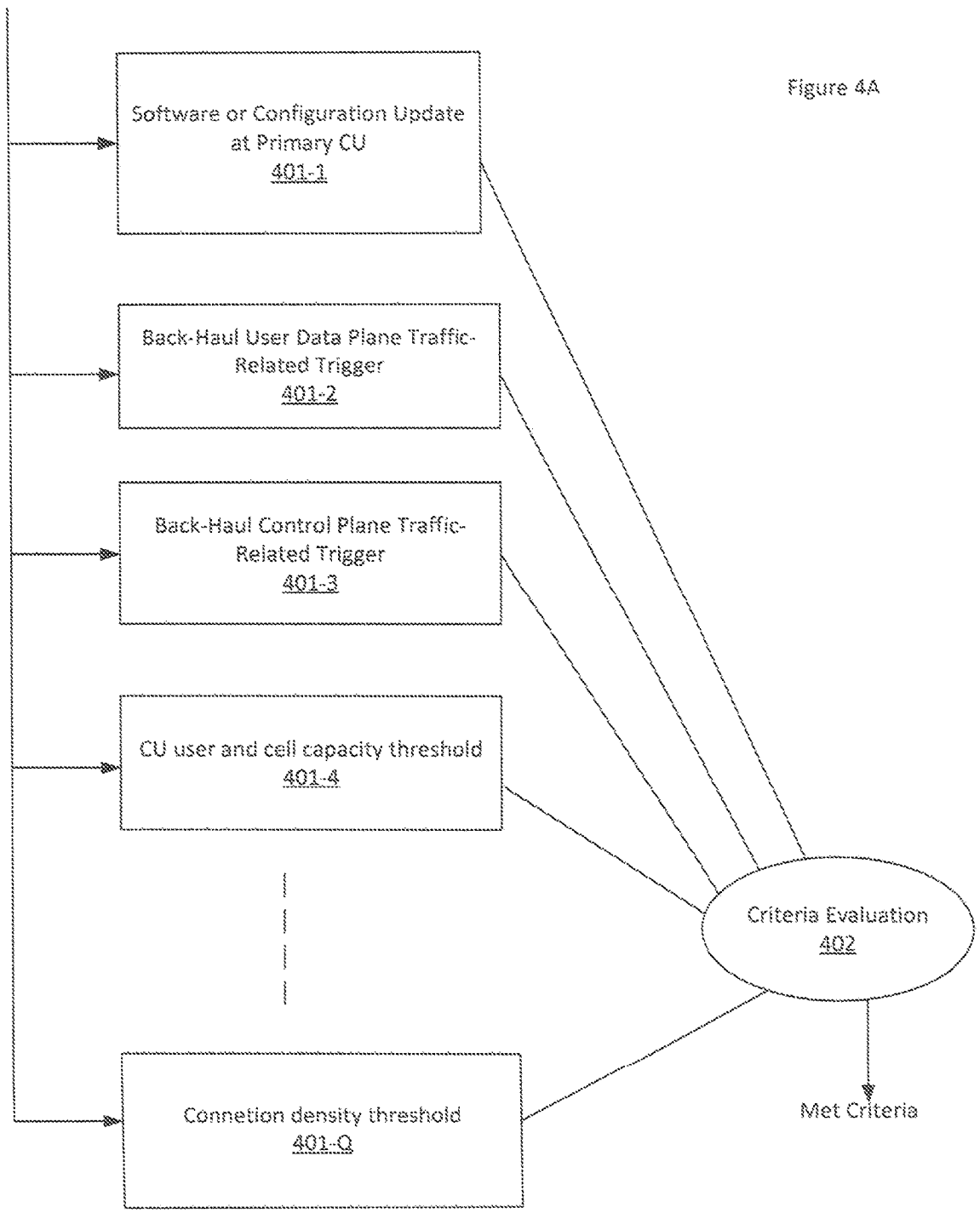
FIG. 4A is a block diagram illustrating schematically a monitoring process, according to one embodiment of the present invention.
Figure 4B:
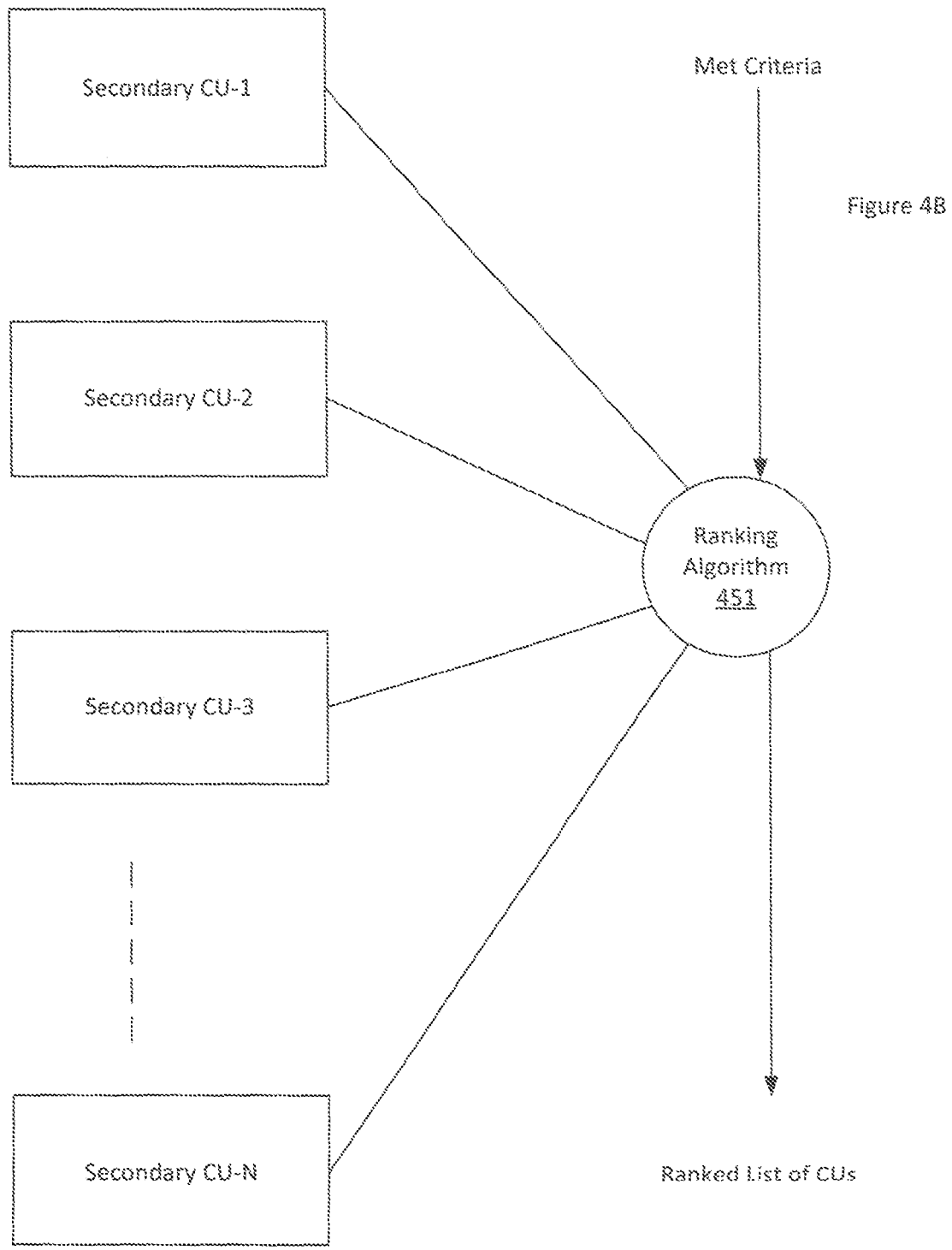
FIG. 4B is a block diagram illustrating a compilation of a ranked list of secondary CUs from which the next primary CU may be selected, in accordance with one embodiment of the present invention.

There are numerous ways to achieve the present invention. FIGS. 3, 4A and 4B illustrate one approach using an algorithmic approach according to one embodiment of the present invention. Alternatively, one may also take a machine-learning or other suitable forms of artificial intelligence-based approaches using, for example, actual operational experience (e.g., supervised or unsupervised learning using neural networks or any other suitable statistical optimization technique). FIG. 3 is an overview that illustrates the operations of a DU, according to one embodiment of the present invention.

As shown in FIG. 3, at the time of initialization, for example, a DU configures itself to provide voice and data services to all the RUs associated with it. At this time, i.e., at step 301, the DU possesses the values of all relevant operating parameters (e.g., mobile unit cumulative capacities, cell site cumulative capacities, and values of quality-of-service (QoS) parameters). At this time, the DU would also have compiled or is otherwise provided a list of CUs available for connection, including all the configuration data necessary and protocols necessary to connect and access each of the CUs. Based on the expected operating conditions, at step 302, the DU then selects from the list of CUs a primary CU and proceed with connecting to the selected CU as its primary CU. In one embodiment, the list has already been ranked according to desirability relative the expected operating conditions. If the selected CU declines the connection request—for example, if the operating conditions at the selected CU have changed—the DU can select another CU as its primary CU from the ranked list. After the primary CU has been established, the DU loads into its memory the configuration parameter values of each of the other CUs—now considered its secondary CUs—so that the DU is ready for switching over to any one of these secondary CUs to primary. In some embodiments, where the protocol requires the secondary CU to be notified, protocol steps ("hand-shaking") may be carried out to establish a tentative connection.

At step 303, the DU monitors any events that may require switching over one of the secondary CUs to primary. Such events may include any significant change in operating conditions, such as when a predetermined threshold on a parameter value has been exceeded, or when the primary CU requires a software or configuration update. FIG. 4A is a block diagram illustrating schematically a monitoring process, according to one embodiment of the present invention. In FIG. 4A, based on the current operating conditions, sensors 401-1 to 401-Q each detect an occurrence of a predetermined significant change and report the occurrence to criteria evaluator 402. In some embodiments, criteria evaluator 402 weighs the occurrences of these significant changes against a collection of predetermined criteria that may result in a switch-over to a secondary CU. In many situations, such as the current primary CU requires a configuration or software update, an additional user plane or control plane service needs to be initialized, and a corresponding predetermined criterion is met. In other situations, a predetermined criterion is met only when two or more of a collection of triggering thresholds are exceeded.

Returning to FIG. 3, at step 304, when one or more of the predetermined criteria are met, a switch-over to one of the secondary CUs is indicated. FIG. 4B is a block diagram illustrating a compilation of a ranked list of secondary CUs from which the next primary CU may be selected, in accordance with one embodiment of the present invention. As shown in FIG. 4B, ranking module 451 weighs each of the configured capabilities of each secondary CU (i.e., secondary CU-1 to secondary CU-N) and the values of their individual current operational conditions to determine the desirability of each secondary CU as the next primary CU. Returning to step 302 of FIG. 3, the DU selects its next primary CU based on the ranked list.

Figure 5:
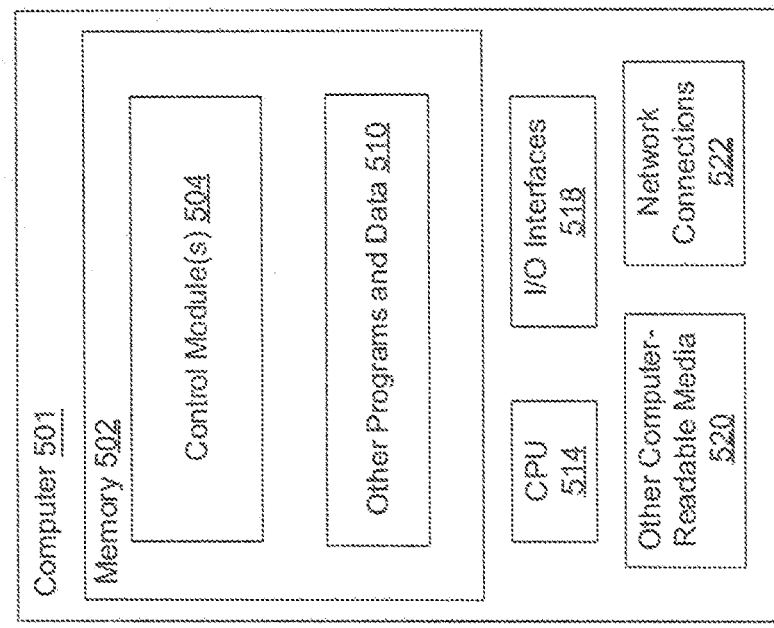
FIG. 5 illustrates an example of underlying hardware on which a CU or a DU of the present invention may be implemented or hosted.

The functionality described herein for the DU may be implemented either on dedicated hardware, as a software instance running on dedicated hardware, or as a virtualized function instantiated on an appropriate platform (e.g., a cloud infrastructure). The CUs are preferably implemented and instantiated in a cloud infrastructure platform, such as processors in a data center. In some embodiments, such functionality may be completely software-based and designed as cloud-native, meaning that they are agnostic to the underlying cloud infrastructure, allowing higher deployment agility and flexibility. However, FIG. 5 illustrates an example of underlying hardware on which a CU or a DU of the present invention may be implemented or hosted. For example, computer 501 may represent an example of computer hardware suitable for providing some or all of the components of DU 204 or any of CU 205-1 to 205-N shown in FIG. 2.

In particular, computer 501 may represent any of various computers used in various data centers, base stations and cell sites herein that are, or that host or implement the functions of: routers, components, microservices, nodes, node groups, control planes, clusters, virtual machines, NFs, and other aspects described herein for a CU or a DU. In some embodiments, one or more special-purpose computing systems may be used to implement the functionality described herein. Accordingly, various embodiments described herein may be implemented in software, hardware, firmware, or in some combination thereof. As shown in FIG. 5, computer 501 may include memory 502, one or more central processing units (CPUs) 514, I/O interfaces 518, other computer-readable media 520, and network connections 522.

Memory 502 may include one or more of memories formed out of various non-volatile and volatile type storage technologies. Examples of memory 502 may include flash memory, hard disk drives, optical drives, solid-state drives, and various types of random-access memory (RAM), various types of read-only memory (ROM), neural networks, other computer-readable storage media (also referred to as processor-readable storage media), or the like, or any combination thereof. Memory 502 may store any suitable information, such as computer-readable instructions that are utilized or executed by CPU 514 for actualizing the functions of the embodiments described herein.

Furthermore, memory 502 may have stored therein values of the various configurable parameters described herein for selection of primary and secondary CUs, such as various threshold values, components and modules described herein for configuring the services of wireless telecommunication networks. Memory 502 may also store other programs and data 510, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 522 are configured to communicate with other computing devices to facilitate the functionality described herein. Network connections 522 may implement any physical, link, transport, and other upper-level packetized communication protocols, including and preferably the Internet Protocol. In various embodiments, the network connections 522 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 518 may include a video interfaces, other data input or output interfaces, or the like. Other computer-readable media 520 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An Open radio access network (ORAN) configured for accessing a 5G Core network to provide voice and data services to one or more mobile terminals, comprising a plurality of radio units, one or more distributed units and a plurality of centralized units, wherein:
   (A) (i) each radio unit is associated with one of the distributed units and is accessible by one or more of the mobile units, the radio unit is configured (a) to conduct a radio data traffic between itself and each accessing mobile terminal, the radio data traffic relating to the voice and data services, and (b) to process the radio data traffic into a physical layer data traffic, and vice versa, the physical layer data traffic being conducted between the radio unit and its associated distributed unit;
   (ii) each distributed unit is configured (a) to associate concurrently a first centralized unit and a second centralized unit, the first and the second centralized units each being one of the plurality of centralized units, (b) to process the physical layer data traffic of each of its associated radio units to provide mid-haul data traffic, and vice versa, the mid-haul data traffic being conducted between the distributed unit and the first centralized unit; and (c) to establish a link to the first centralized unit as a primary CU from a ranked list of accessible centralized units based on current operating conditions and configure a tentative link to the second centralized unit as a secondary centralized unit based on predetermined criteria; and
   (iii) each centralized unit is configured to process the mid-haul data traffic of each of its associated distributed units to provide back-haul data traffic, and vice versa, the back-haul data traffic being conducted between the centralized unit and the 5G Core network; and
   (B) each distributed unit is further configured, in response to an occurrence of a predetermined condition, to conduct its mid-haul data traffic with its associated second centralized unit.

2. The ORAN of claim 1, wherein the back-haul data traffic comprises control plane and user plane data traffic with the 5G Core network.

3. The ORAN of claim 2, wherein the control plane traffic comprises packetized data related to Access Mobility Functions (AMF) hosted in the 5G Core network.

4. The ORAN of claim 2, wherein the user plane data traffic relates to user plane functions hosted in the 5G Core network related to the voice and data services.

5. The ORAN of claim 4, wherein the user plane functions comprise functions provided by a Session Management Service (SMF).

6. The ORAN of claim 1, wherein the predetermined condition comprises an update of configuration in the first centralized unit.

7. The ORAN of claim 6, wherein the update of configuration relates to an update of one or more operational parameters.

8. The ORAN of claim 6, wherein the predetermined condition comprises a software update.

9. The ORAN of claim 1, wherein the predetermined condition comprises reaching at least one of a plurality of predetermined thresholds.

10. The ORAN of claim 9, wherein the predetermined threshold of the plurality of predetermined thresholds relates to a different one of: availability, CU user and cell-site capacities, PDCP service features, peak data rates, peak and spectral efficiencies, data rates experienced by different user types, area traffic capacities, user-plane latencies, connection densities, energy efficiency, reliability, mobility, mobility interruption times, and system, mid-haul and back-haul aggregated bandwidths; and the conducting the mid-haul data traffic with its associated second centralized unit in response to the occurrence of the predetermined condition includes determining which of each of the plurality of predetermined thresholds has been met.

11. A method for providing an Open radio access network (ORAN) configured for accessing a 5G Core network to provide voice and data services to one or more mobile terminals, the ORAN comprising a plurality of radio units, one or more distributed units and a plurality of centralized units, the method comprising:

(A) configuring:
   (i) each radio unit to associate with one of the distributed units and to be accessible by one or more of the mobile units, the radio unit being configured for (a) conducting a radio data traffic between itself and each accessing mobile terminal, the radio data traffic relating to the voice and data services, and (b) processing the radio data traffic into a physical layer data traffic, and vice versa, the physical layer data traffic being conducted between the radio unit and its associated distributed unit;
   (ii) each distributed unit for (a) associating concurrently a first centralized units and a second centralized unit, the first and the second centralized units each being one of the plurality of centralized units, (b) processing the physical layer data traffic of each of its associated radio units to provide mid-haul data traffic, and vice versa, the mid-haul data traffic being conducted between itself and the first centralized unit, and (c) to establish a link to the first centralized unit as a primary CU from a ranked list of accessible centralized units based on current operating conditions and configure a tentative link to the second centralized unit as a secondary centralized unit based on predetermined criteria; and
   (iii) each centralized unit for processing the mid-haul data traffic of each of its associated distributed units to provide back-haul data traffic, and vice versa, the back-haul data traffic being conducted between the centralized unit in the 5G Core network; and (B) further configuring each distributed unit for, subsequent to an occurrence of a predetermined condition, conducting its mid-haul data traffic with its associated second centralized unit.

12. The method of claim 11, wherein the back-haul data traffic comprises control plane and user plane data traffic with the 5G Core network.

13. The method of claim 12, wherein the control plane traffic comprises packetized data related to Access Mobility Functions (AMF) hosted in the 5G Core network.

14. The method of claim 12, wherein the user plane data traffic relates to user plane functions hosted in the 5G Core network related to the voice and data services.

15. The method of claim 14, wherein the user plane functions comprise functions provided by a Session Management Service (SMF).

16. The method of claim 11, wherein the predetermined condition comprises an update of configuration in the first centralized unit.

17. The method of claim 16, wherein the update of configuration relates to an update of one or more operational parameters.

18. The method of claim 16, wherein the predetermined condition comprises a software update.

19. The method of claim 11, wherein the predetermined condition comprises reaching a predetermined threshold.

20. The method of claim 19, wherein the predetermined threshold relates to one or more of: availability, CU user and cell-site capacities, PDCP service features, peak data rates, peak and spectral efficiencies, data rates experienced by different user types, area traffic capacities, user-plane latencies, connection densities, energy efficiency, reliability, mobility, mobility interruption times, and system, mid-haul and back-haul aggregated bandwidths.

* * * * *